United States Patent [19]

Murphy

[11] Patent Number: 5,055,343
[45] Date of Patent: Oct. 8, 1991

[54] PATTERNED METALLIZED FILM AND METHOD FOR MAKING SAME

[75] Inventor: James J. Murphy, Medinah, Ill.

[73] Assignee: American Decal & Manufacturing Company, Chicago, Ill.

[21] Appl. No.: 355,914

[22] Filed: May 23, 1989

[51] Int. Cl.⁵ .................. B32B 15/04; B32B 7/12; B05D 5/06
[52] U.S. Cl. .................. 428/209; 427/164; 427/275; 427/365; 427/376.7; 428/40; 428/211; 428/343; 428/344; 428/346; 428/347; 428/352; 428/354; 428/457; 428/913; 428/914
[58] Field of Search .......... 428/40, 41, 202, 203, 428/204, 209, 211, 343, 346, 349, 352, 913, 914; 156/230, 233, 656, 443, 584, 344; 40/615, 638; 524/271; 427/376.7, 365, 388.1, 275, 162, 164; 525/327.3; 73/862.65

[56] References Cited

U.S. PATENT DOCUMENTS

| | | | |
|---|---|---|---|
| 3,351,515 | 11/1967 | Muttera | 428/346 |
| 3,893,982 | 7/1975 | Gardner et al. | 525/327.3 |
| 3,896,246 | 7/1975 | Brady | 428/41 |
| 3,956,558 | 5/1976 | Blanco et al. | 428/204 |
| 4,173,507 | 11/1979 | Tobey | 156/443 |
| 4,173,510 | 11/1979 | Tobey | 156/584 |
| 4,177,104 | 12/1979 | Parker | 156/584 |
| 4,216,048 | 8/1980 | Gehweiler | 156/344 |
| 4,280,939 | 7/1981 | Johnson | 524/271 |
| 4,299,644 | 11/1981 | Arnold | 156/230 |
| 4,379,805 | 4/1983 | Downing et al. | 428/346 |
| 4,406,912 | 9/1983 | Downing | 428/352 |
| 4,461,793 | 7/1984 | Blok et al. | 428/913 X |
| 4,522,067 | 6/1985 | Burger et al. | 73/862.65 |
| 4,620,365 | 11/1986 | Burger et al. | 156/656 |
| 4,693,935 | 9/1987 | Mazurek | 428/352 |
| 4,769,265 | 9/1988 | Coburn | 428/40 |

FOREIGN PATENT DOCUMENTS

| | | | |
|---|---|---|---|
| 982819 | 2/1976 | Canada | 40/615 |
| 1484080 | 8/1977 | United Kingdom | 428/204 |
| 2168620 | 10/1985 | United Kingdom | 428/40 |

OTHER PUBLICATIONS

Mass Replication of Holographic Imagery, Coburn Corporation, Lakewood, N.J.
Spar Cal Pressure Sensitive Products Industrial Self-Adhesive Products, Spartan Plastics, Inc. Holt, Michigan.

*Primary Examiner*—Thomas J. Herbert
*Attorney, Agent, or Firm*—Arnold, White & Durkee

[57] ABSTRACT

A patterned metallized film comprises a transparent or translucent polymeric film coated on one side with a thin coating of metal, with the metal coating and the polymeric film being bonded to each other. The metal coating has a multiplicity of fractures of different sizes distributed throughout the coating in a prescribed pattern so that the reflection of light by the fractured metal coating produces a three-dimensional illusion of the pattern when viewed through said polymeric film. The film may also include a layer of adhesive on the opposite side of the metal coating from the polymeric film, and a paper backing sheet on the opposite side of the adhesive layer from the metal coating. The fractures are preferably formed by heating the metallized film non-uniformly so that selected areas of the film expand and soften at a rate different from the rate at which other areas of said film expand and soften. The different rates of expansion and softening produce multiple fractures in the metal coating between the selected areas and the other areas, whereby the fractures replicate the desired pattern.

23 Claims, 1 Drawing Sheet

PATTERNED METALLIZED FILM AND METHOD FOR MAKING SAME

BACKGROUND OF THE INVENTION

1. Technical Field

The present invention relates generally to patterned metallized films of the type used to form decals and posters and in a wide variety of other decorative applications for boats, trucks, appliances, walls and the like.

2. Description of the Related Art

Patterned metallized films have been made for decorative purposes for many years. These films are typically laminates which include a decorative metallized polymeric film having a design thereon, an adhesive layer on one side of the decorative film for affixing the film to a mounting surface, a releasable backing sheet which protects the adhesive layer prior to mounting, and, in some cases, a protective polymeric layer which protects the exposed surface of the decorative film. The design may be printed on the polymeric film before it is metallized. As used herein, the term "patterned" includes decorative designs, alpha-numeric patterns, realistic or abstract illustrations, logos, and actual images of wood grains, gold leaf, and the like. Some examples of typical applications for patterned metallized films include advertising or logos for vehicles, pinstriping, outdoor signs, wall coverings, window signs, point-of-sale displays, etc.

Three-dimensional effects have been produced on patterned metallized polymeric films by holographic imagery, and also by embossing or otherwise contouring the reflective metal coating that is deposited on the polymeric film. Sparkling effects have also been produced on non-metallized films by depositing many small fragments of metal or pre-metallized polymer onto the film (instead of a smooth continuous coating of metal) as described, for example, in Coburn U.S. Pat. No. 4,769,265. These techniques, however, are costly, and result in products which are usually priced about three times as high as metallized films, with our without printed images thereon. Moreover, many of these exotic films usually have a relatively short life when used in outdoor applications where the film is subjected to continual temperature variations and other weathering conditions.

SUMMARY OF THE INVENTION

It is a primary object of the present invention to provide patterned metallized films without the use of printing inks, without permanently embossing or otherwise contouring the metal coating or the film, and without the need to deposit any materials other than a metal coating on the polymeric film. In this connection, a related object of the invention is to provide such a film in which the pattern is formed by a multiplicity of minute discontinuities within the metal coating on the polymeric film.

Another important object of the invention is to provide a patterned metallized film which produces a unique three-dimensional effect at a fraction of the cost of previous three-dimensional films such as holograms and embossed or contoured laminates.

It is a further important object of the invention to provide a patterned metallized film of the foregoing type which is a smooth, flat film that is easy to keep clean.

Still another object of the invention is to provide a patterned metallized film which can be manufactured at about the same cost as a plain metallized film.

A further object of the invention is to provide a patterned metallized polymeric film which is capable of replicating virtually any desired pattern and in any desired color, with unique and attractive three-dimensional effects.

Yet another object of the invention is to provide an improved decorative film of the type described above which has a long life even when used in outdoor applications where the film is subjected to continual temperature variations and other weathering conditions.

It is a still further object of the invention to provide a unique method of forming a pattern on a metallized polymeric film without the use of printing inks, so that the patterned film can be efficiently manufactured at a low cost. In this connection, a related object of the invention is to provide a method of forming a patterned metallized film which eliminates ink drying times as well as storage, disposal, flammability and toxicity problems typically associated with printing inks, thereby reducing production time and the overall cost of producing such a film.

In accordance with the present invention, the foregoing objectives are realized by providing a patterned metallized film comprising a transparent or translucent polymeric film coated on one side with a thin coating of reflective metal, the metal coating and the polymeric film being bonded to each other, and the metal coating having a multiplicity of fractures of different sizes distributed throughout the metal coating in a prescribed pattern so that the reflection of light by the fractured metal coating produces a three-dimensional illusion of the pattern when viewed through the polymeric film.

There is also provided a method of producing a patterned metallized film comprising the steps of metallizing a transparent or translucent polymeric film on one side with a thin coating of reflective metal, and producing a preselected pattern in the metal coating by selectively fracturing the metal coating to produce a multiplicity of fractures distributed throughout the metal coating in accordance with the preselected pattern.

BRIEF DESCRIPTION OF THE DRAWINGS

Other objects and advantages of the invention will become apparent upon reading the following detailed description and upon reference to the drawings in which.

Figure 1:
FIG. 1 illustrates a patterned metallized film embodying the present invention.

While the invention is susceptible to various modifications and alternative forms, specific embodiments thereof have been shown by way of example in the drawings and will be described in detail herein. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENT

Figure 2:
FIG. 2 is a sectional view of the film of FIG. 1 taken generally along line 2—2 in FIG. 1.

Referring initially to FIGS. 1 and 2, a decorative metallized film forms a pattern which is viewable from one side of the film. As shown in FIG. 2, the decorative film is a laminate which includes a polymeric film, a metal coating bonded to one side of the film, a layer of adhesive on the metal coating, and a backing sheet covering the adhesive. The polymeric film is a flat film with smooth planar surfaces, and the metal coating is applied to one of the smooth planar surfaces with a substantially uniform thickness over the entire surface of the film. The pattern is formed by the metal coating, as will be described in more detail below, and the polymeric film is transparent or translucent so that the pattern is viewable through the film.

Metallization of the polymeric film can be accomplished by any of the conventional processes used in the production of metallized films for use in the packaging industry, decals, and the like. Such films are typically metallized by known vapor deposition processes and equipment. The most commonly used metal is aluminum, although a variety of other metals are capable of being deposited by vapor deposition techniques. For example, gold can be vapor deposited, but gold is so expensive that it is normally simulated by forming the polymeric film from a colored polymer, or coating a transparent polymeric film with a transparent color, and then depositing aluminum on the colored film.

The remaining layers of the laminate are preferably formed by first applying the adhesive to the backing sheet, and then laminating the adhesive-coated backing sheet and the metallized side of the polymeric film to form the decorative film. The backing sheet is normally made of paper which has been treated with a silicone release agent so that the backing sheet can be readily peeled off the adhesive when it is desired to apply the metallized film to a selected surface. For window signs, the adhesive-coated backing sheet is laminated to the non-metallized side of the metallized polymeric film.

The adhesive may be either pressure-sensitive, heat-activatable, or solvent-activatable adhesive. Although the pressure-sensitive adhesives are preferred for most applications, heat-activatable adhesives offer significant advantages in applications where the decorative film must be precisely positioned on the surface to which it is adhered. Solvent-activatable adhesives also facilitates positioning, and are often the least expensive adhesives, particularly when the solvent is water.

It has been found that patterns can be formed in the reflective metal coating by producing a multiplicity of fractures of different sizes distributed throughout the metal coating in the desired pattern so that the reflection of light by the fractured metal coating produces an attractive replica of the pattern when viewed through the polymeric film. Selectively applied heat produces the desired distribution of fractures in the metal coating when the laminate is fabricated from appropriate materials. For example, the application of heat to the laminate through a conventional printing plate which has raised and recessed areas defining a desired pattern, while the raised areas of the plate are pressed against the laminate, causes the areas of the laminate in contact with the raised areas of the plate to be heated at a faster rate than the areas of the laminate adjacent the recessed portions of the plate. The resulting non-uniform heating of the laminate produces temperature differentials across the surface of the metallized film so that different areas of the film expand and soften at different rates. These different rates of expansion and softening produce a multiplicity of fractures of different sizes in the metal coating, and the fractures are distributed in the same pattern defined by the areas of different heating rates, i.e., the pattern defined by the printing plate.

The polymeric film may be made of a variety of different polymers which can be metallized, which can be softened and expanded by heating, and which have the requisite degree of transparency or translucence. Maximum transparency is usually desired, but in certain cases a translucent polymer might be preferred over a transparent polymer to achieve a particular visual effect. It is normally preferred that the polymer also be resistant to ultraviolet light so that the metallized film will not deteriorate for several years, e.g., for five years or longer, when used in outdoor applications. Suitable polymers include many acrylic, polyvinyl butyral, and vinyl polymers, and certain polyurethane-acrylic or polyurethane-polyester copolymers. Specific examples of suitable polymers are:

| Du Pont | Acrylic | Elvacite 2014 |
|---|---|---|
| Rohm & Haas | Acrylic | B-44S |
| Monsanto | Polyvinyl Butyral | Butvar B-90 or B-98 |
| Union Carbide | Vinyl | VMCH |
| Occidental Chemical | Vinyl | FPC 470 |

A suitable polyurethane-acrylic copolymer is made by combining Henkel Corporation's G-Cure 867 (a hydroxyl functional acrylic copolymer) with Mobay Chemical Corporation's Desmodur N-75 (an aliphatic polyisocyanate) at room temperature.

A suitable polyurethane-polyester copolymer is made by reacting Cargill polyester II 6638 with Cargill polyurethane prepolymer #4505. The resulting copolymer forms a tough durable non-yellowing film with excellent flexibility and impact resistance.

For improved abrasion resistance of the metallized polymer, a polyurethane film may be laminated or coated on the non-metallized surface of the metallized polymer.

Figure 3:
FIG. 3 illustrates a printing plate for forming the image replicated on the film of FIG. 1.
Figure 4:
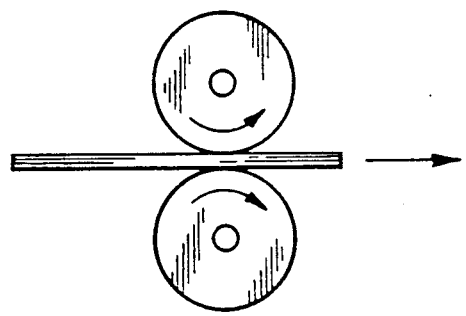
FIG. 4 illustrates an apparatus used to form the metallized film of FIGS. 1 and 2 using the printing plate of FIG. 3.

FIGS. 3 and 4 illustrate appropriate apparatus for non-uniformly heating a metallized film of the type described above so as to produce temperature differentials across the surface to the film. Referring initially to FIG. 3, a standard printing plate, such as a plastic flexigraphic printing plate or a metal letter press printing plate, has a raised pattern thereon which is the mirror image of the pattern to be formed on the film. To form the pattern on the film, the plate is pressed against the film while heating the film so as to cause the film to expand and soften non-uniformly across its surface. That is, different areas of the film are expanded and softened at different rates and/or at different times. This non-uniform expansion and softening occurs because the plate causes those portions of the metallized film in contact with the raised areas of the plate to be heated more quickly than those portions of the film registered with the recessed areas of the plate. This differential heating causes a multiplicity of fractures of various sizes to occur in the metal coating. The resulting distribution of fractures over the entire area of the metallized film not only replicates the pattern on the printing plate, but also produces a unique three-dimensional effect in the replicated pattern when viewed through the polymeric film.

The apparatus of FIG. 4 includes a heated roll which is adapted to rotate in the direction indicated by the arrow, and a patterned roll disposed radially adjacent the heated roll and adapted to rotate in the direction indicated by the arrow. The roll is preferably heated by supplying a heated fluid such as oil to one or more cavities inside the roll. The surface of the patterned roll forms a raised pattern such as that formed by the printing plate shown in FIG. 3. Indeed, patterned printing plates such as the plate are normally wrapped around cylinders to form patterned rolls such as the roll for use in a printing press. Such conventional printing rolls are suitable for use in the method of this invention without any modification.

The rolls form a nip therebetween for accepting the metallized film, which passes between the rolls and in the direction of the arrow. The spacing between the rolls and is adjusted to apply the necessary pressure to the metallized film as it passes between the rolls, as in conventional printing operations.

When the metallized film passes between the rolls and, the heated roll is at a temperature substantially above that of the patterned roll. Then as the metallized film passes through the nip, heat is transferred from the heated roll to the metallized film. Those areas of the metallized film that are pressed against the heated roll by the raised portions of the pattern on the roll are heated at a faster rate, and thus expand and soften at a faster rate, than those areas of the metallized film that register with the recessed portions of the pattern on the roll. As described above, it is this differential heating that produces the desired pattern of fractures in the metal layer.

The fracturing of the metal layer has been previously described in relation to a metallized film which includes only the polymeric layer and the metal layer. However, the metal layer is preferably fractured after the metallized film has been fully fabricated to include not only the polymeric layer and the metal layer, but also the adhesive layer and the backing sheet (as shown in FIG. 2).

To further enhance the fracturing of the metal layer, the backing sheet is preferably made of a heat-shrinkable material; then the heating of the laminate also causes those portions of the backing sheet which register with the raised portions of the pattern on the roll to shrink at a rate different from that at which the other portions of the backing sheet shrink. This differential shrinkage of the backing sheet, in combination with the differential expansion and softening of the polymeric layer, quickly produces the desired pattern of fractures of different sizes in the metal layer to replicate the pattern of the roll. Thus, the laminate can be passed through the nip at relatively high speeds, thereby permitting attainment of high production rates and correspondingly low costs. Ordinary release paper is a suitable heat shrinkable backing sheet.

The following working examples are illustrative of presently preferred embodiments of the invention:

EXAMPLE NO. 1

A two-mil acrylic film, commercially available as A-223 film from Vinyl Cast Film, Inc., was metallized by vacuum deposition of aluminum. Monsanto Company's #737 pressure-sensitive acrylic adhesive was coated on a silicone release paper manufactured by H. P. Smith and laminated to the metallized acrylic film. The resulting laminate was then passed through the nip of a pair of rolls which applied sufficient pressure to insure proper contact with the surfaces of both rolls. One of the rolls was a metal roll heated internally with oil to 300° F., while the other roll carried a flexigraphic printing plate and was not heated. After passing through the nip, the laminate exhibited the mirror image of the pattern on the flexigraphic printing plate, with a three-dimensional effect. Microscopic examination of the processed laminate revealed a multitude of small fractures of different sizes throughout the metal coating. The fractures were distributed in a pattern that followed the pattern of the flexigraphic printing plate.

EXAMPLE NO. 2

The two-mil acrylic film of Example No. 1 was printed with a transparent color before it was metallized. After being passed through the nip of the same rolls used in Example No. 1, the image on the flexigraphic printing plate was again replicated in the final processed laminate with a spectacular colored metallic three-dimensional effect.

EXAMPLE NO. 3

A film of the polyurethane-acrylic copolymer described above was cast on a release paper made by S. D. Warren. The cast film was then coated with Rohm & Haas acrylic polymer B-44S. The resulting film was then metallized by vacuum deposition of aluminum, as in Example No. 1, and laminated to the same adhesive coated release paper used in Example No. 1. The resulting laminate was passed through the nip of the same rolls used in Example No. 1, producing an even more brilliant three-dimensional print pattern than in Example No. 1.

I claim:

1. A patterned metallized film comprising a transparent or translucent polymeric film coated on one side with a thin coating of metal, said metal coating and said polymeric film being bonded to each other, and said metal coating having a multiplicity of fractures of different sizes distributed throughout the metal coating in a prescribed pattern so that the reflection of light by the fractured metal coating produces a three-dimensional illusion of said pattern when viewed through said polymeric film.

2. The patterned metallized film of claim 1 wherein said polymeric film is a flat film with smooth planar surfaces, and said metal coating is applied to one of said smooth planar surface with a substantially uniform thickness over the entire surface.

3. The patterned metallized film of claim 1 which includes a layer of adhesive on the opposite side of said polymeric film from said metal coating.

4. The patterned metallized film of claim 1 which includes a layer of adhesive on the opposite side of said metal coating from said polymeric film.

5. The patterned metallized film of claim 4 which includes a paper backing sheet on the opposite side of said adhesive layer from said metal coating.

6. The patterned metallized film of claim 4 wherein said layer of adhesive is selected from the group consisting of pressure-sensitive adhesives, solvent-activatable adhesives, and heat-activatable adhesives.

7. A patterned metallized film comprising a polymeric layer which has been non-uniformly expanded and softened by heating said polymeric layer in a preselected pattern, and then cooling said polymeric layer to room temperature;
- a metal coating adherent to a surface of said polymeric layer;
- a layer of adhesive adherent to said metal coating; and
- a backing sheet, adherent to said layer of adhesive, which has been non-uniformly shrunk by heating said backing sheet in said preselected pattern,
- said metal coating containing a multiplicity of fractures of different sizes formed by the combination of the non-uniform shrinkage of said backing sheet and the non-uniform expansion and softening of said polymeric layer, said fractures being distributed throughout said metal coating in accordance with said preselected pattern.

8. The patterned metallized film of claim 7 wherein said polymeric layer is transparent.

9. The patterned metallized film of claim 7 wherein said polymeric layer is translucent.

10. The patterned metallized film of claim 7 wherein said polymeric layer is transparent or translucent, capable of being expanded and softened by heat, and capable of being metallized.

11. The patterned metallized film of claim 7 wherein said layer of adhesive is selected from the group consisting of pressure-sensitive adhesives, solvent-activatable adhesives, and heat-activatable adhesives.

12. A patterned metallized film comprising
- a layer of a polymer that expands and softens when heated;
- a metal coating adherent to a surface of said polymeric layer;
- a layer of adhesive adherent to said metal coating; and
- a heat shrinkable backing sheet adherent to said layer of adhesive,
- said metal coating being fractured by heating said polymeric layer, metal coating, adhesive and backing sheet in a preselected pattern so that said polymeric layer expands and softens non-uniformly and said backing sheet shrinks non-uniformly, the combination of the non-uniform shrinkage of said backing sheet and the non-uniform expansion and softening of said polymeric layer fracturing said metal coating so that the resulting fractures are distributed throughout said metal coating in accordance with said preselected pattern.

13. A method of forming a patterned metallized film, said method comprising the steps of
- coating a transparent or translucent polymeric film on one side with a thin coating of reflective metal, said metal coating and said polymeric film being adherent to each other, and said polymeric film being expandable and softenable by heat, and
- heating the metal-coated polymeric film in a prescribed pattern so that portions of the metal-coated polymeric film are heated at a faster rate than other portions, said portions that are heated at a faster rate defining said prescribed pattern.

14. The method of claim 13 wherein said heating of said metal-coated polymeric film produces a multiplicity of fractures of different sizes distributed throughout the metal coating in a prescribed pattern so that the reflection of light by the fractured metal coating produces a three-dimensional illusion of said pattern when viewed through said polymeric film.

15. A method of producing a patterned metallized film, said method comprising the steps of
- metallizing a transparent or translucent polymeric film on one side with a thin coating of reflective metal, and
- producing a preselected pattern in said metal coating by selectively fracturing said metal coating by heating selected areas of said metallized film at different rates to produce a multiplicity of fractures distributed throughout said metal coating in accordance with said pattern.

16. The method of claim 15 wherein said selected area which are heated define said pattern so that the resulting fractures are distributed according to said pattern.

17. The method of claim 15 wherein the heating of said film causes said selected areas of said film to expand and soften at a rate different from the rate at which other areas of said film expand and soften, said different rates of expansion and softening producing multiple fractures in said metal coating between said selected areas and said other areas, whereby said fractures replicate said pattern.

18. The method of claim 15 which includes the steps of applying a layer of adhesive to the opposite side of said polymeric film from said metal coating, and covering said layer of adhesive with a release-treated backing sheet.

19. The method of claim 15, wherein said metal coating is selectively fractured by passing said metallized film through an apparatus comprising
- a heated roll adapted to rotate in a first angular direction; and
- a patterned roll disposed radially adjacent said heated roll and adapted to counter-rotate with respect to said heated roll in a second angular direction, said rolls forming a nip therebetween for accepting said metallized film and being disposed to apply a predetermined amount of pressure to said metallized film as it passes through the nip between said rolls.

20. The method of claim 15 which includes the steps of applying a layer of adhesive to said layer of metal and covering said layer of adhesive with a release-treated backing sheet.

21. The method of claim 20 wherein said backing sheet shrinks when heated.

22. The method of claim 21 wherein said metal coating is selectively fractured by heating said polymeric film after metallizing said film and after applying said layer of adhesive and said backing sheet.

23. The method of claim 22 wherein the heating of said film causes said selected areas of said film to expand and soften at a rate different from the rate at which other areas of said film expand and soften, and causes like selected areas of said backing sheet to shrink at a rate different from the rate at which other areas of said backing sheet shrink, said different rates of expansion, softening and shrinkage producing multiple fractures in said metal coating between said selected areas and said other areas, whereby said fractures replicate said pattern.

* * * * *